United States Patent
Cavote

(10) Patent No.: US 9,382,002 B1
(45) Date of Patent: *Jul. 5, 2016

(54) DRONE FOR INSPECTION OF ENCLOSED SPACE AND METHOD THEREOF

(71) Applicant: United Dynamics Advanced Technologies Corporation, Brooks, KY (US)

(72) Inventor: John M. Cavote, Brooks, KY (US)

(73) Assignee: United Dynamics Advanced Technologies Corporation, Brooks, KY (US)

(*) Notice: Subject to any disclaimer, the term of this patent is extended or adjusted under 35 U.S.C. 154(b) by 130 days.

This patent is subject to a terminal disclaimer.

(21) Appl. No.: 14/520,442

(22) Filed: Oct. 22, 2014

Related U.S. Application Data

(63) Continuation of application No. 13/693,319, filed on Dec. 4, 2012, now Pat. No. 8,874,283.

(51) Int. Cl.
| | |
|---|---|
| *G05D 1/00* | (2006.01) |
| *B64C 39/02* | (2006.01) |
| *H04N 5/232* | (2006.01) |
| *H04N 5/76* | (2006.01) |
| *H04N 7/18* | (2006.01) |
| *H04N 5/225* | (2006.01) |

(52) U.S. Cl.
CPC ............ *B64C 39/024* (2013.01); *G05D 1/0038* (2013.01); *H04N 5/23203* (2013.01); *H04N 5/76* (2013.01); *H04N 7/185* (2013.01); *B64C 2201/123* (2013.01); *B64C 2201/127* (2013.01); *B64C 2201/146* (2013.01); *H04N 2005/2255* (2013.01)

(58) Field of Classification Search
CPC ...... B64D 47/08; B64D 31/06; B64C 39/024; B64C 2201/127; B64C 2201/027; B64C 2201/042; B64C 2201/108; F22B 21/00; F22B 37/00
USPC ........................ 701/2, 11, 28, 31.4, 36; 901/1
See application file for complete search history.

(56) References Cited

U.S. PATENT DOCUMENTS

| | | | |
|---|---|---|---|
| 2,101,399 | A | 12/1937 | Larsen |
| 3,013,747 | A | 12/1961 | Grihangne et al. |
| 3,811,320 | A | 5/1974 | Cowell |
| 4,029,164 | A | 6/1977 | Urakami |
| 4,121,865 | A | 10/1978 | Littwin, Sr. |
| 4,163,535 | A | 8/1979 | Austin |
| 4,174,081 | A | 11/1979 | Sardanowdky |
| 4,478,379 | A | 10/1984 | Kerr |
| 4,995,574 | A | 2/1991 | Bernard et al. |
| 5,015,187 | A | 5/1991 | Lord |
| 5,209,431 | A | 5/1993 | Bernard et al. |
| 5,467,813 | A | 11/1995 | Vermaat |
| 5,497,960 | A | 3/1996 | Previnaire |
| 5,793,647 | A * | 8/1998 | Hageniers et al. ............. 702/35 |

(Continued)

FOREIGN PATENT DOCUMENTS

| | | |
|---|---|---|
| JP | 11079020 | 3/1999 |
| WO | 2009109711 | 9/2009 |

*Primary Examiner* — Gertrude Arthur Jeanglaud
(74) *Attorney, Agent, or Firm* — Middleton Reutlinger

(57) ABSTRACT

Embodiments of a drone for inspection and a method of use are depicted wherein the drone is utilized in an enclosed space and is capable of being controlled with or without line of sight to the aircraft. The drone may hover or land on surfaces within the enclosed space for the inspection.

20 Claims, 12 Drawing Sheets

(56) References Cited

U.S. PATENT DOCUMENTS

| | | |
|---|---|---|
| 6,450,445 B1 | 9/2002 | Moller |
| 6,634,593 B2 | 10/2003 | Lepretre et al. |
| 7,318,564 B1 | 1/2008 | Marshall |
| 7,398,946 B1 | 7/2008 | Marshall |
| 7,410,125 B2 | 8/2008 | Steele |
| 7,422,505 B2 | 9/2008 | Van de Rostyne |
| 7,425,167 B2 | 9/2008 | Van de Rostyne |
| 7,425,168 B2 | 9/2008 | Van de Rostyne |
| 7,467,984 B2 | 12/2008 | Van de Rostyne |
| 7,494,397 B2 | 2/2009 | Van de Rostyne |
| 7,510,142 B2 | 3/2009 | Johnson |
| 7,543,780 B1 | 6/2009 | Marshall et al. |
| 7,662,013 B2 | 2/2010 | Van de Rostyne et al. |
| 7,815,482 B2 | 10/2010 | Van De Rostyne |
| 7,883,392 B2 | 2/2011 | Van de Rostyne et al. |
| 8,002,604 B2 | 8/2011 | Van De Rostyne et al. |
| D648,808 S | 11/2011 | Seydoux et al. |
| D648,809 S | 11/2011 | Seydoux et al. |
| 8,205,577 B2 | 6/2012 | Sia et al. |
| 8,210,126 B2 | 7/2012 | Sia et al. |
| 8,214,088 B2 | 7/2012 | Lefebure |
| 2003/0025032 A1* | 2/2003 | Lepretre et al. ............... 244/7 B |
| 2007/0215750 A1 | 9/2007 | Shantz et al. |
| 2008/0220687 A1 | 9/2008 | Taya |
| 2009/0132100 A1 | 5/2009 | Shibata |
| 2010/0212983 A1 | 8/2010 | Lama |
| 2010/0227527 A1 | 9/2010 | Smoot et al. |
| 2011/0049290 A1 | 3/2011 | Seydoux et al. |
| 2011/0301784 A1 | 12/2011 | Oakley et al. |
| 2012/0255501 A1 | 10/2012 | Sia et al. |
| 2012/0273680 A1 | 11/2012 | Furry |

* cited by examiner

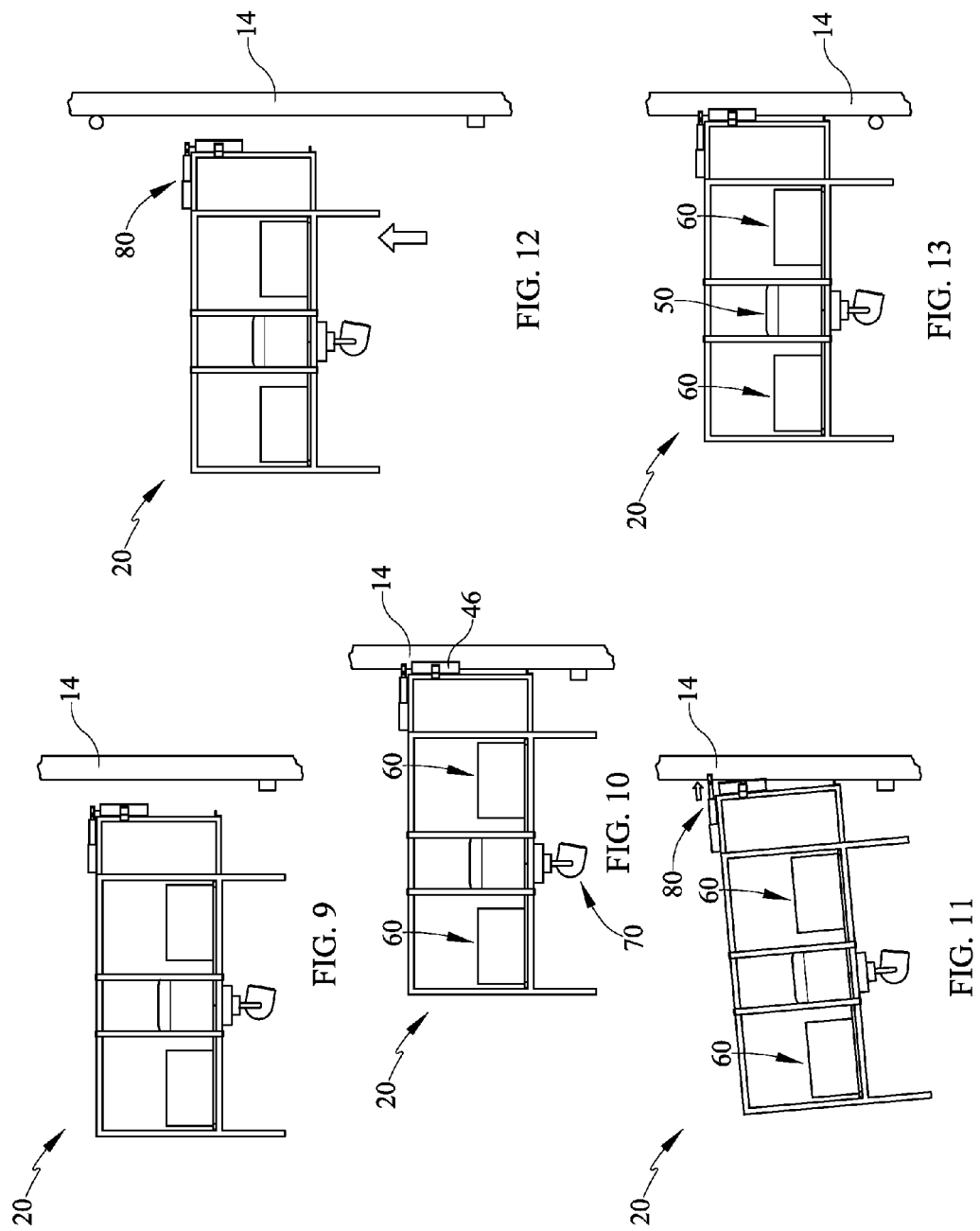

US 9,382,002 B1

DRONE FOR INSPECTION OF ENCLOSED SPACE AND METHOD THEREOF

CLAIM TO PRIORITY

This Continuation Application claims priority to and benefit of under 35 USC §120 to pending non-provisional application having U.S. patent application Ser. No. 13/693,319, filed Dec. 4, 2012 titled, "Drone for Inspection of Enclosed Space and Method Thereof", all of which is incorporated by reference herein.

STATEMENT REGARDING FEDERALLY SPONSORED RESEARCH

None.

REFERENCE TO SEQUENTIAL LISTING, ETC.

None.

BACKGROUND

1. Field of the Invention

Present embodiments relate to a drone device and related method. More specifically, present embodiments relate to a drone for inspection of an enclosed space and a method thereof.

2. Description of the Related Art

The process of inspecting enclosed spaces, for example such as a boiler of a power generating turbine, is a process which is tedious, labor intensive, and provides opportunity for injury to an inspector. During the process, a scaffold must be constructed within the interior of the boiler and along the wall perimeter of the enclosed space to inspect the burners, steam piping or tubing at multiple elevations. As a result, the scaffold must be constructed level by level upon itself to move up along the sidewalls of the enclosed space for inspection of all the boiler walls or steam tubes. This requires manpower and downtime of the boiler both of which result in lost time of operation of the turbine associated with the boiler being inspected. Typically, the inspection process cannot begin until the scaffold system is constructed at least partially. However, this construction process takes time again leading to increased outage time for the boiler.

It is desirable to have a system of inspection which may begin sooner than when a scaffold construction may be completed, in order to reduce downtime of an outage.

An additional problem with inspection of the enclosed space is that the walls are generally vertical and are lined with steam tubing and/or burners along the interior surface thereof in large part. Thus, the necessity of a scaffold system provides a landing at multiple elevations wherein an inspector may be located to perform the inspection. Otherwise, the interior of the boiler is generally without landing surfaces upon which an inspector may perform the inspection thoroughly at multiple elevations.

Accordingly, it is desirable to overcome this lack of horizontal landing surface and other deficiencies with known inspection processes in order to provide a thorough inspection of the interior of a boiler while reducing downtime associated with an outage.

SUMMARY

According to some embodiments, an unmanned remote control inspection vehicle, comprises an airframe including at least one propulsion assembly, a video camera allowing for pivotal movement, a video transmitter, a controller with flight avionics to control the at least one propulsion assembly, a transceiver in communication with the controller and a remote control, a landing assembly connected to the airframe, the landing assembly having at least one support structure for landing in a first orientation and at least one second support structure for landing in a second orientation, a detaching mechanism to release the landing assembly from a surface in one of the first and second orientations. The unmanned remote control inspection vehicle wherein the landing assembly has the at least one support structure being generally horizontal in orientation. The unmanned remote control inspection vehicle wherein the landing assembly has the at least one second support structure being generally vertical in orientation. The unmanned remote control inspection vehicle wherein the landing assembly includes a landing frame having a first strut and a second strut. The unmanned remote control inspection vehicle wherein the landing assembly includes a third and a fourth strut. The unmanned remote control inspection vehicle further comprising a retaining mechanism one of the at least one first and second support mechanism for landing in a vertical orientation. The unmanned remote control inspection vehicle wherein the retaining mechanism has magnetic landing feet. The unmanned remote control inspection vehicle wherein the magnetic feet are pivotable about a vertical axis. The unmanned remote control inspection vehicle wherein the magnetic feet are movable to change width between said landing feet.

According to an alternate embodiment, an unmanned remote control inspection vehicle, comprises an airframe including a plurality of propulsion assemblies, a controller in communication with the plurality of propulsion assemblies, a remote control in wireless communication with the controller to control flight of the vehicle, a landing structure connected to the airframe, the landing structure allowing landing on a surface parallel to a gravity force, the landing structure allowing landing on a surface perpendicular to a gravity force, a retaining mechanism on the landing structure and a detachment mechanism, a video camera onboard the vehicle for inspection. The unmanned remote control inspection vehicle wherein the retaining mechanism is magnetic. The unmanned remote control inspection vehicle wherein the detachment mechanism is a linear actuator. The unmanned remote control inspection vehicle wherein the landing structure has at least one strut in vertical orientation and at least one strut in a horizontal direction. The unmanned remote control inspection vehicle further comprising a receiver for electronic communication between the remote control and the controller. The unmanned remote control inspection vehicle wherein the video camera is mounted on a gimbal allowing at least one degree of pivot.

According to at least one further embodiment, an unmanned remote control inspection vehicle, comprises an airframe having at least one propulsion assembly, a controller in electrical communication with the at least one propulsion assembly, a receiver in communication with the controller, the receiver in wireless communication with a remote control, at least one camera for video inspection and non-line-of-flight of the vehicle, a landing structure connected to the airframe, the landing structure having a first portion defining a first outer boundary of the vehicle along a first dimensional axis and a second portion defining a second outer boundary of the vehicle along a second dimensional axis. The vehicle further comprising a rechargeable battery. The vehicle wherein the propulsion assembly includes an electric motor. The vehicle wherein the at least one camera is an inspection camera. The vehicle wherein the at least one camera includes a pilot camera.

According to some embodiments, a method of inspecting a boiler, comprises positioning a remote control unmanned aircraft adjacent an enclosed space, flying the aircraft within the enclosed space, flying to a first position, landing the aircraft on one of a vertical sidewall or vertical steam piping within the boiler, scanning an area of the enclosed space with a video camera, powering up a propulsion assembly, detaching the vehicle from the one of a vertical sidewall or vertical steam piping within the boiler, flying the aircraft to a second position. The method further comprises flying by line of sight. The method further comprises flying by video from the video camera. The method further comprising a sending an acoustic signal toward a wall of the enclosed space to locate the aircraft. The method further comprises engaging the one of a vertical sidewall or vertical steam piping with a magnet on a landing assembly. The method further comprises recording video on the aircraft. The method further comprises wirelessly transmitting a video signal from the camera to a control station. The method further comprises recording a video signal at a control station. The method further comprises viewing video in real-time at a control station.

According to some other embodiments, a method of boiler inspection with an unmanned remote control aircraft, comprises establishing a control area for flying said aircraft, flying the aircraft within the boiler, transmitting video of the flight to the control area for guiding said aircraft, guiding the aircraft to a generally vertical landing position, landing the aircraft at the generally vertical landing position, powering down at least one propulsion assembly, scanning an area of the boiler with a camera, recording video of the scanning, detaching the aircraft from the generally vertical landing position; flying to a second landing position and, landing at said second landing position. The method further comprises powering up the at least one propulsion assembly. The method wherein the recording occurs on-board said aircraft. The method wherein the recording occurs at the control area. The method further comprises powering up the at least one propulsion assembly. The method further comprises scanning an area at the second landing area of the boiler. The method further comprises actuating an actuator to perform the detaching. The method further comprises depowering magnets to perform the detaching. The method further comprises adjusting feet for the landing. The method further comprises adjusting at least one of width, pivot about a vertical axis and pivot about a horizontal axis.

According to other embodiments, a method of inspecting an enclosed space with an unmanned remote control aircraft with at least one camera, comprises establishing a control area for flying the aircraft, flying the aircraft into a first inspection area within the enclosed space, capturing images of a condition of the first inspection area during the flight, and recording the images of the first inspection area at one of on-board the aircraft and at the control area. Optionally, the control area is disposed outside of the enclosed space or within the enclosed space and wherein the flying is by line of sight. The method further comprises hovering the aircraft at the first inspection area. The method further comprises transmitting the images of a condition of the first inspection area in the form of video or still photos to the control area.

According to other embodiments, a method of inspecting an enclosed space with an unmanned remote control aircraft with at least one camera, comprises flying the aircraft to a first inspection area within the enclosed space, hovering the aircraft near the first inspection area within the enclosed space, capturing images of the first inspection area with a camera, and recording the images of the first inspection area at one of memory on-board the aircraft and at the control area. Optionally, the method further comprises establishing a control area to fly the aircraft which is one of inside or outside the enclosed space. The method further comprises transmitting images to the control area when the control area is outside of the enclosed space. The method further comprises flying the aircraft to a second inspection area. The method further comprises creating a report for the first inspection area.

According to other embodiments, a method of inspecting an enclosed space with an unmanned remote control aircraft with at least one camera, comprises flying the aircraft within an enclosed space for inspecting an inspection area within the enclosed space, capturing images of the inspection area with a camera on-board the aircraft wherein the images are one of video or still images, recording the images of the inspection area at one of on-board the aircraft and at a control area. Optionally, the flying may be by line of sight and by video transmission. The method further comprises transmitting the images from the aircraft to the control area. The method further comprises hovering the aircraft in the first inspection area for the capturing images. The method further comprises attaching the aircraft to a vertical surface adjacent to the first inspection area.

BRIEF DESCRIPTION OF THE DRAWINGS

In order that the description may be better understood, embodiments of the inspection drone and method will now be described by way of one or more examples. These embodiments are not to limit the scope of the claims as other embodiments of the inspection drone and method of use will become apparent to one having ordinary skill in the art upon reading the instant description. Non-limiting examples of the present embodiments are shown in figures wherein:

FIG. 9 is a side view of an exemplary drone positioned away from a wall of the enclosed space.

FIG. 10 is a side view of an exemplary drone positioned on the wall of the enclosed space at a first stable position.

FIG. 11 is a side view of a drone with the actuator activated for detachment of the drone.

FIG. 12 is a side view of an exemplary drone moved toward a second position away from the wall of the enclosed space.

FIG. 13 is a side view of an exemplary drone moved to the wall of the enclosed space at the second position.

DETAILED DESCRIPTION

Figure 1:
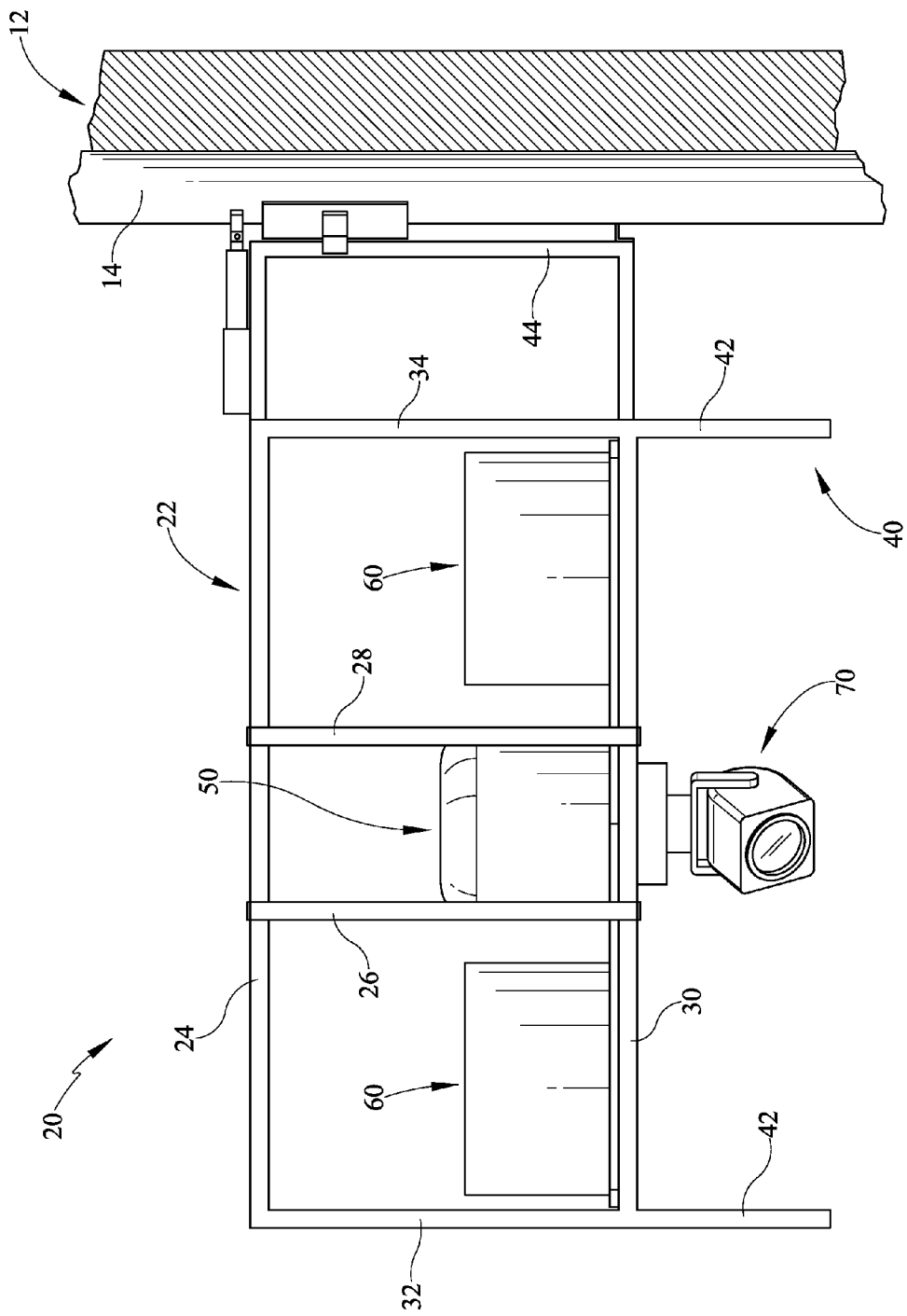
FIG. 1 is a side section view of an enclosed spaced with a drone landed on a vertical sidewall in a stable position.

It is to be understood that the inspection drone with vertical attachment mechanism is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1 through 16 various embodiments of a drone or unmanned aerial vehicle (UAV) are depicted. The drone is used for inspection of an enclosed space, for example in a boiler, during an outage. The use of such drone or UAV allows for faster start to the inspection process wherein maintenance does not first require construction of large scaffold systems.

Referring now to FIG. 1, a side view of an exemplary drone or unmanned aerial vehicle (UAV) is depicted within an enclosed space 12, such as, for example, a boiler. The exemplary boiler includes a plurality of steam tubes 14 disposed along the interior sidewall of the boiler structure. A burner or array of burners 16 (FIG. 14) may be disposed within the sidewall providing combustion heat water or other fluid within the steam tubes 14 of the boiler 12 in a manner well understood. The view depicts the drone 20 which is disposed against a sidewall of the boiler 12 and, specifically according to the exemplary embodiment, landed on one of the steam tubes 14.

Figure 5:
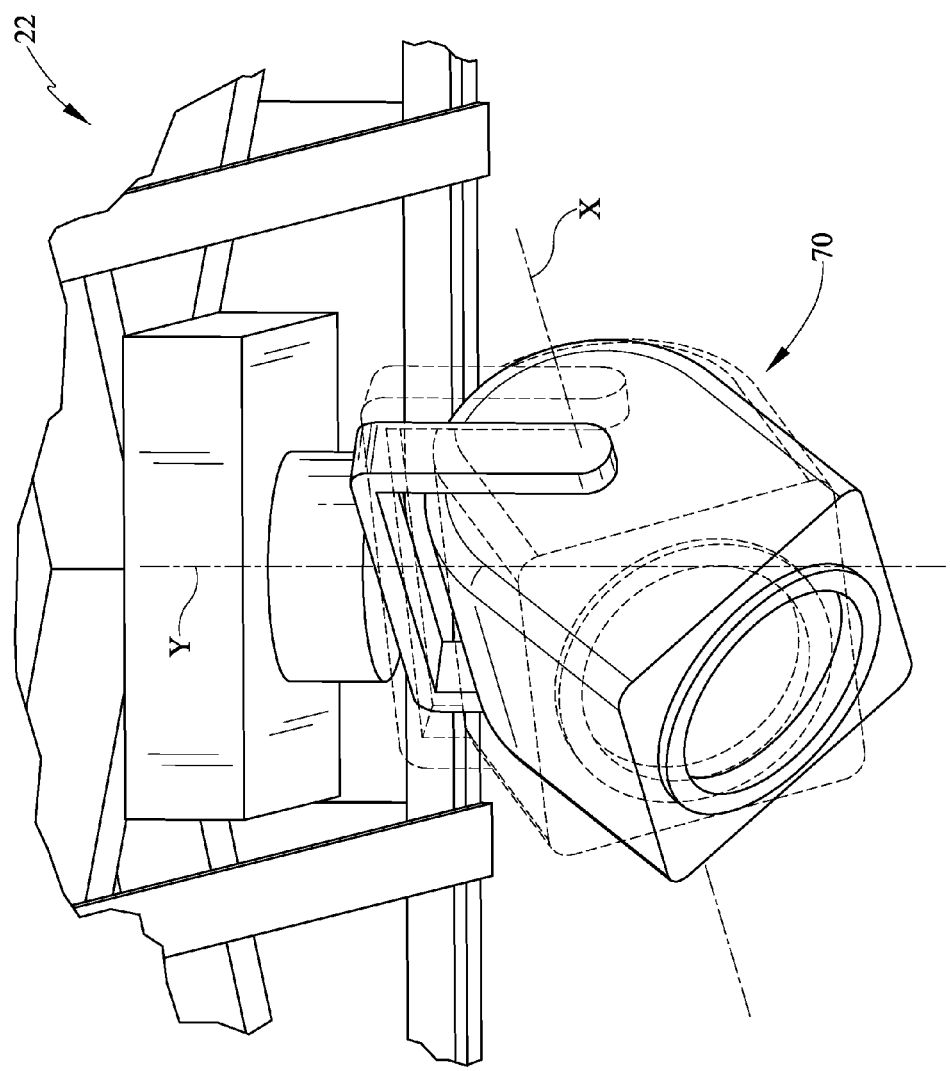
FIG. 5 is a lower perspective view of a drone with the camera shown in multiple positions.
Figure 6:
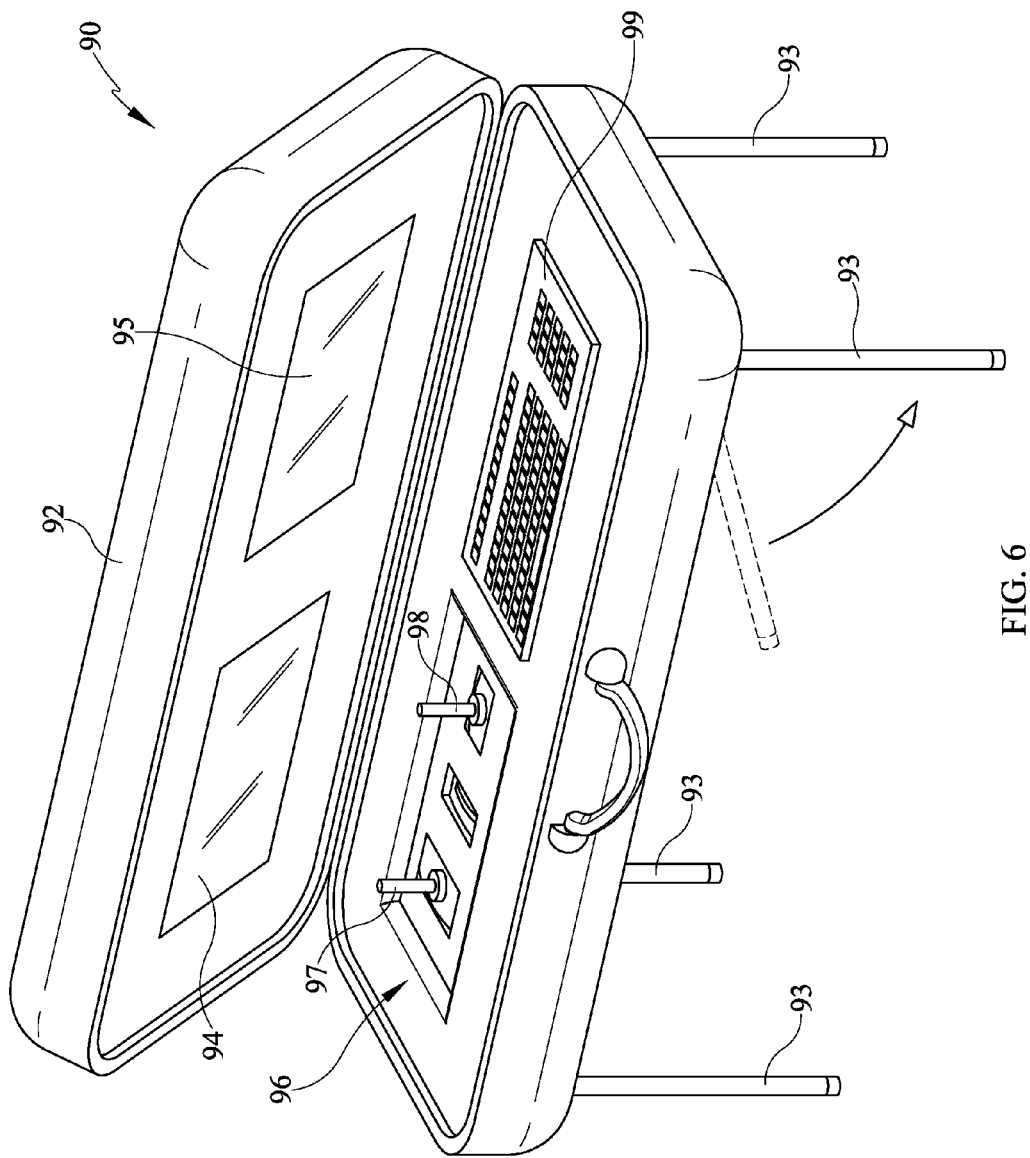
FIG. 6 is a perspective view of the control station for flying the drone.

A drone 20 or unmanned aerial vehicle (UAV) is a flying device that is remotely piloted or controlled by a controller or controller station 90 (FIG. 6). The drone 20 is typically unmanned and therefore requires control by a pilot at a remotely positioned location. The drone 20 may fly by operator line of sight or alternatively may fly with the aid of cameras installed on the drone 20 or unmanned aerial vehicle (UAV). The drone 20 is generally of smaller scale dimensions than a full-size aircraft and may have one or more rotors which allow the vehicle to fly in a manner typically associated with an airplane or as normally associated with a helicopter or quadricopter. A quadricopter may be defined as a four-rotor machine, as will be understood by one skilled in the art, and is used in the exemplary embodiments described herein. Additionally, basic piloting functions are defined for controlling flight operations of the drone 20 by various means such as the engine thrust or actuators, ailerons or other flaps and these are dependent upon the type of flight. Further, various functions are described such as pitching, rolling, yawing and varying altitude. These functions are described relative to the X, Y and Z axes (FIG. 5) defining an orthogonal reference system. For example, pitching is defined as tilting the drone 20 relative to the Z axis; the pitching may occur in a forward direction or in a rearward direction opposite the forward direction. Rolling is a tilting of the drone 20 about an X axis lying in the plane of the drone 20. A left roll causes the drone 20 to move to its left and a right roll causes the drone 20 to move to its right. Yawing is a pivoting of the drone 20 about its vertical Y axis causing the drone 20 to turn left or turn right. Varying altitude or elevation is a movement of the drone 20 vertically along the vertical Y axis to either ascend or descend such as to start or stop flying or takeoff or land the drone 20. In order to perform these functions, the drone 20 20 may include a tilt detector, accelerometer or gyroscope to determine a direction of pitch, yaw, roll or sonic signal transceiver to send and receive sonic signals to determine elevation or change of elevation. The control of the drone 20 may utilize wired or wireless technology. According to exemplary embodiments, the controller is in communication with a receiver of the drone 20 by wireless means such as Wi-Fi standards, blue-tooth standards or other known radio frequency control means. The drone 20 may include stabilization technology to provide stabilized flight such as leveling and hovering at a preselected elevation or relative to a specific structure. The system provides stabilization of the drone 20 in hovering flight, for example, in the absence of any user input to a remote control. When automatically stabilized in hovering flight, the drone 20 allows even inexperienced pilots the ability to pilot the drone without needing to act directly using traditional flight controls. Therefore, the pilot may take advantage of intuitive piloting based on simple horizontal and vertical movements of the controller. The flight of the drone 20 is therefore transformed into movement between successive equilibrium points through the use of simple commands such as climb, descend, left, right, forward or backward, etc. Thus, the stabilization system provides corrections that are needed to maintain at stationary points by "trimming" or making numerous corrections due to external affects such as air movement and drift of the drone 20.

The drone 20 includes an airframe 22 having a plurality of members 24, 26, 28, 30, 32, 34. The airframe 22 further comprises a vertical landing assembly 40 which includes at least one support structure or member 42 for landing drone 20 on a first landing surface orientation and a second support structure or member 44 for landing the drone 20 on a second landing surface orientation. The landing assembly 40 structures 42, 44 may be integrally formed with the other members of the drone 20 or may be formed separately. Relative to this view for example, the structures 42 may be used to land on a generally horizontal surface. Alternatively, the structures 44, for example, allow landing on a generally vertical surface.

The drone 20 also comprises a controller 50 which comprises a microprocessor or computer with various flight avionics to aid in the control of the drone 20. The drone 20 also comprises at least one propulsion assembly 60 to cause flight of the drone 20 and allow for yaw movement, pitch movement, roll, and the elevation change orientation.

The drone 20 also comprises at least one camera 70 which is utilized to inspect the interior portions of the boiler 12 and the surfaces of the steam tubes 14 as well as aid in non-line-of-sight flight of the drone 20. In some embodiments, the at least one camera 70 may include a second pilot camera 71 (FIG. 8) which may be mounted with the camera 70 or in a different location of the drone 20. The pilot camera 71 may be utilized if the drone 20 is flown in a non-line-of-sight scenario.

Figure 2:
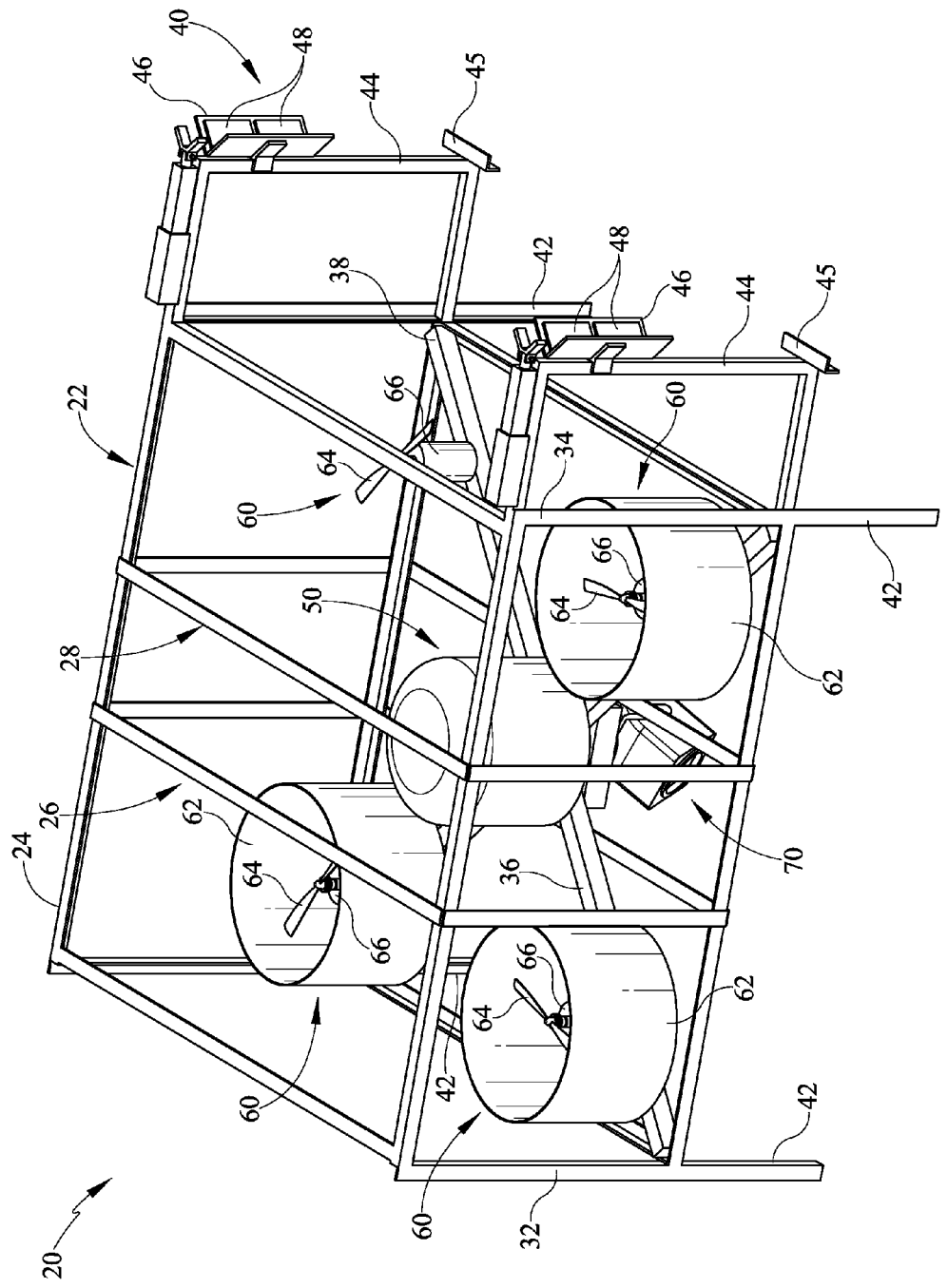
FIG. 2 is a perspective view of an exemplary drone.

Referring now to FIG. 2, a perspective view of the drone 20 is depicted for better understanding of the structures of the unmanned aerial vehicle (UAV). The airframe 22 is generally rectangular box-shaped and formed of lightweight material such as plastics, carbon-fiber or lightweight alloys. The members 26, 28 may be rectangular and extend about the entire airframe 22 or may be formed of singular structures or members that are connected individually to members 24, 30 and other members of the airframe. Although a rectangular box-shaped airframe 22 is depicted, alternate shapes may be utilized and the depicted embodiment is merely exemplary of one airframe structure which houses or protects various assembly structures defining the drone 20.

The drone 20 of the instant exemplary embodiment is a quadricopter, meaning the device has four propulsion assemblies 60. Each of the propulsion assemblies 60 includes a cowling 62 which surrounds a propeller 64, improving thrust and also protecting the propellers 64 from unintended strikes. Optionally, the cowlings 62 may be removed, as shown in the upper right exemplary assembly 60 of FIG. 2 depending on the efficiency, control, weight issues. The exemplary propellers 64 have two blades. However, various designs may include additional numbers of blades. The propulsion assemblies 60 further comprise motors 66 disposed beneath the propellers 64 to provide torque to the propellers and the thrust from the propulsion assemblies 60.

A controller 50 is positioned centrally within drone 20 and is generally low in the assembly to lower the center of gravity in the height direction of the drone 20. Cross members 36, 38 are disposed beneath the controller 50 and extending the propulsion assemblies 60. These members 36, 38 provide strength for the drone 20 and additionally provide a conduit path for electrical conductors. Beneath controller 50 is the camera 70 which is mounted on a gimbal and rotatable about a vertical axis as well as about a horizontal axis to provide various degrees of movement in multiple directions for improved inspection and flight control. The drone 20 may further comprise a battery for use in powering the device for flight and inspection operations.

Also, connected to the airframe 22 is a landing assembly 40 having at least one support structure 42 which allows the unmanned aerial vehicle (UAV) to land on a generally horizontal surface. The support structures 42 are generally vertical. This allows for landing of the drone 20 on surfaces which are horizontal or at some angle relative to horizontal.

A second support structure 44 is generally vertical to allow for the drone 20 to land on surfaces or structures that are also generally vertical. The support structure 44 of the exemplary embodiment includes a retaining mechanism 46 which according to the exemplary embodiment comprises one or more magnets 48. The magnets 48 are mounted on an angle iron shaped bracket such that retaining mechanism 46 and magnets 48 may grasp or urge the drone 20 into tangential engagement with steam tubes 14 (FIG. 1) along the interior surface of the boiler 12 (FIG. 1). At a lower end of the supports 44 are spacers 45 which position the lower end of the drone 20 away from the vertical surface to compensate for the retaining mechanism 46. Thus, the spacers 45 position the lower end of the structure 44 at the same distance from the steam tube 14 as the top end of the structure 44 and retaining mechanism 46. The magnets 48 may be permanent magnets or may be electromagnets which are powered or depowered to retain or disengage from the wall or tubes of the enclosed space 12.

Figure 3:
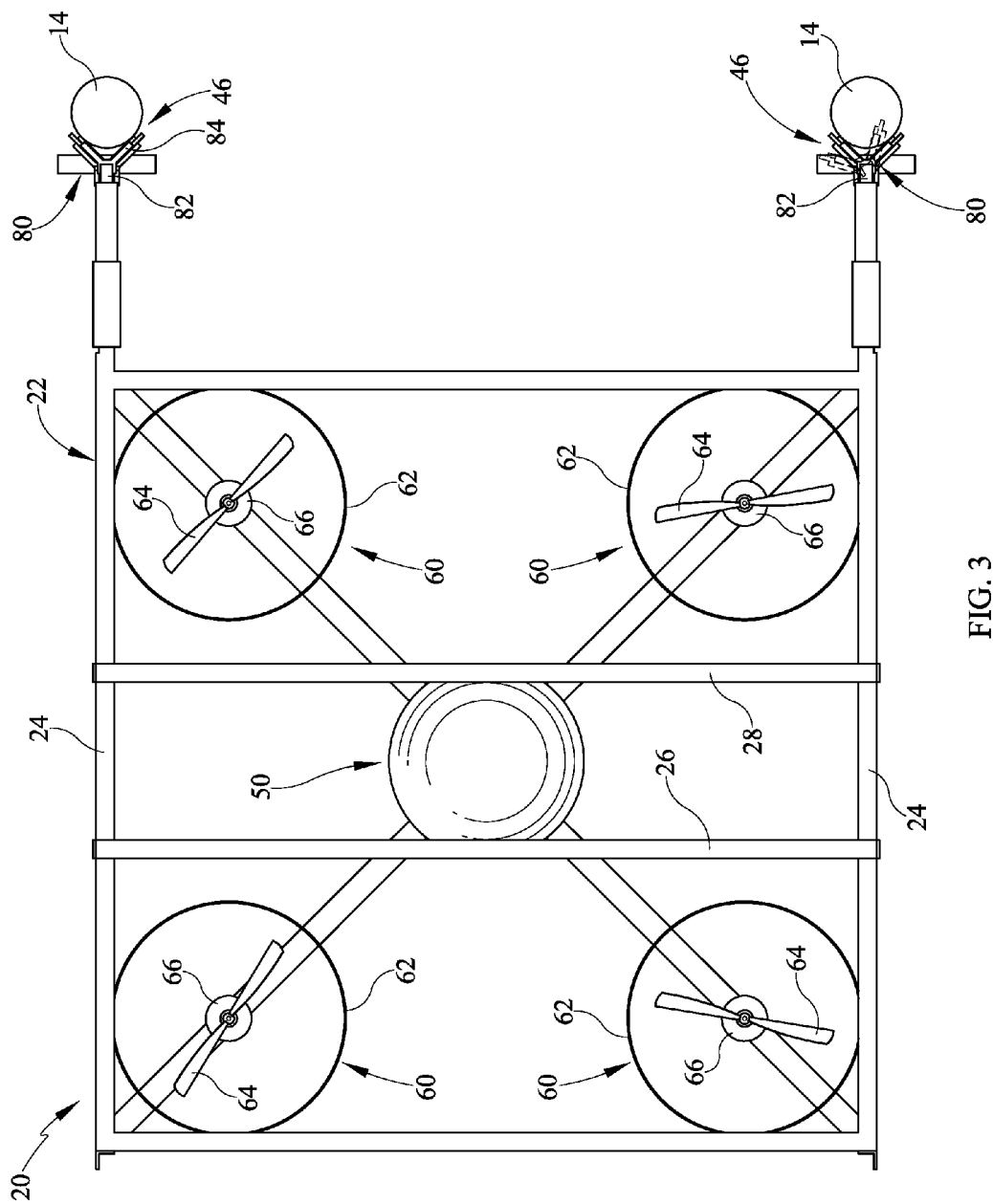
FIG. 3 is a top view of a linear actuator.

Referring now to FIG. 3, a top view of the drone 20 is depicted with a view depicting movement of the retaining mechanism 46. As shown in the depicted embodiment, the retaining mechanism 46 may pivot about a vertical axis so as to improve engagement of magnets 48 (FIG. 2) with the steam tubes 14. The pivoting motion of the retaining mechanism 46 is shown by the various positions depicted in broken line relative to the position depicted in solid line. Thus, if the retaining mechanism 46 engages the steam tube 14 in an off-centered position, the retaining mechanism 46 will pivot so as to center itself relative to the steam tube 14 as depicted in the upper embodiment shown in the figure. Optionally, the support structures 44 (FIG. 2) may also be formed to be movable manually or automatically toward or away from one another to accommodate different spacing between steam tubes 14.

Additionally, the drone 20 includes a detachment mechanism 80. The detachment mechanism 80 includes an actuator 82 which moves linearly to engage or disengage the retaining mechanism 46 from the steam tube 14. The actuator 82 is connected to a push member 84 which engages the steam tube 14 when the actuator 82 moves.

Referring still to FIG. 3, the actuators 82 are located on members of the airframe 22. The retaining mechanisms 46 may also be moveable in a direction either toward or away from one another. This will allow for use with piping of varying spacing which may be found in different boilers. Thus, while the center distance between tubes 14 may differ, the movement of retaining mechanisms 46 in a direction toward and away from one another will compensate for differentiation of size in the direction between steam tubes 14.

Figure 4:
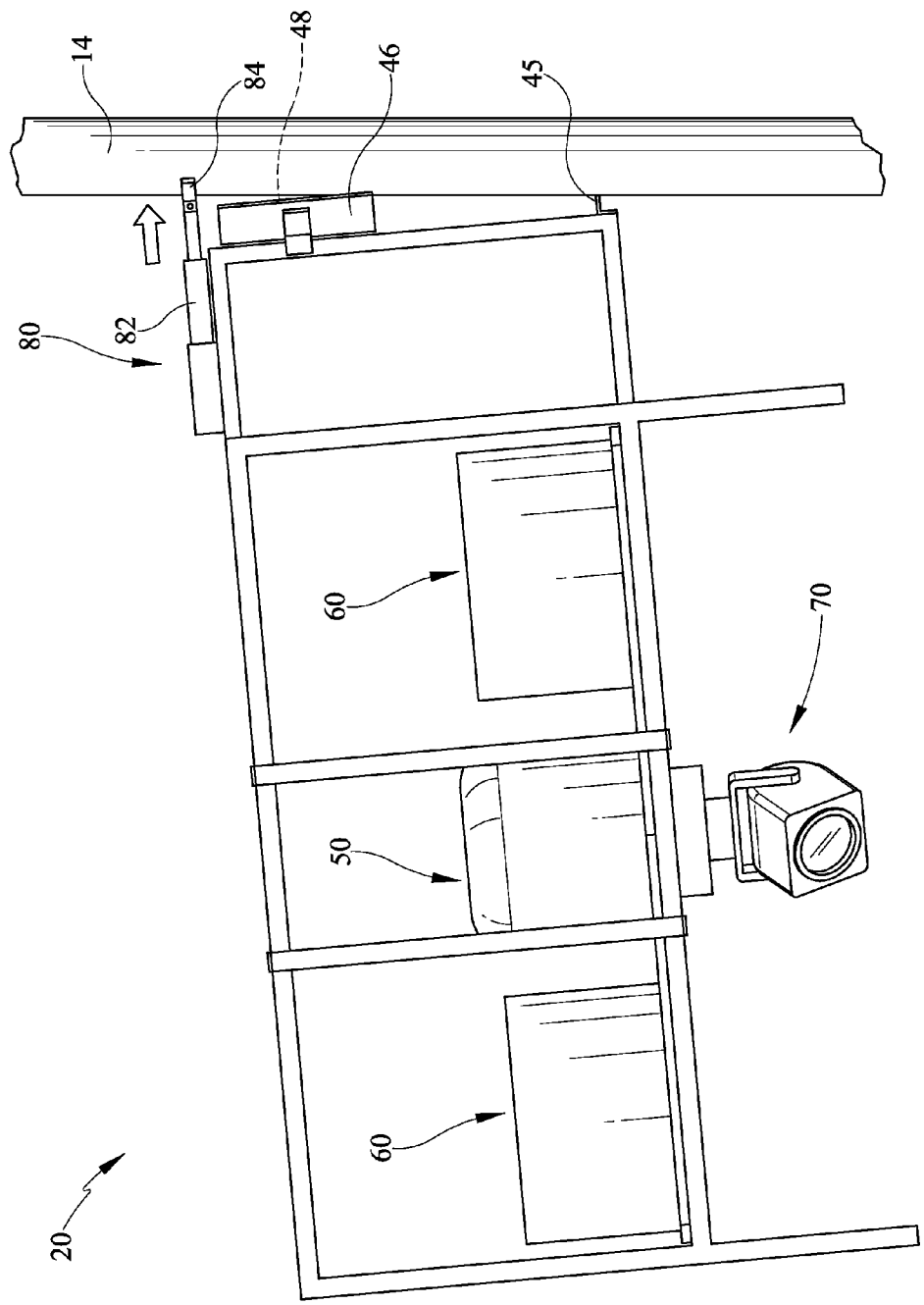
FIG. 4 is a side view of an embodiment of the actuator in an extended position to detach the drone from the steam pipes.

With reference to FIG. 4, the detachment mechanism 80 is shown in operation. The actuator 82 is extended so that push member 84 engages steam tube 14. As depicted, the drone 20 pivots on element 45 as the magnets 48 detach from the tube 14.

During this time, the controller 50 powers the propulsion assemblies 60 upwardly so that at time of the detachment of retaining elements 46, the drone 20 does not uncontrollably fall but instead enters a controlled hover upon separation from the static structure, for example the steam tubes 14 or sidewall of boiler 12.

Referring now to FIG. 5, a detailed perspective view of the camera 70 is depicted. The camera 70 may be a high definition camera having a CMOS chip and resolution of 720p, 1080i or 1080p. The camera 70 may also allow still photographs in addition to video footage. The camera is mounted on a gimbal or other pivoting structure to allow rotation about 2 axes, the X-axis and the Y-axis for example. The camera 70 is shown in solid line in a first position. However, the camera 70 is also shown rotated slightly about the vertical axis in a broken line. Additionally, the camera is rotated about the horizontal X-axis in the position shown in the same broken line. The camera 70 may be rotatable about 360° about the vertical axis and about 200° about the X-axis. The camera 70 is located beneath the airframe 22 to provide an unobstructed view when operating. However, the camera 70 may be moved to various locations of the drone 20 and the depicted position should not be considered limiting. Additionally, the camera 70 may be moveable in a third dimension that is linearly along near the X or Y axis to provide improved viewing clarity.

Referring now to FIG. 6, a perspective view of a controller station 90 is depicted including a housing 92 which may be hingeably openable or closeable and may include legs 93 for ease of setup. The legs 93 may be foldable between a closed and extended position. Various forms of extendable legs may be utilized such as retractable, nestable, or pivotable between opened and closed positions, as depicted. The housing interior includes at least one video monitor 94. The control station 90 includes at least one video monitor 94 through which the video footage of camera 70 may be viewed during operation of the drone 20. A second video monitor 95 may be utilized to perform programming at edits for the processor within the controller 50 of the drone 20. This monitor 95 may be also utilized to control other features such as stability, functionality of the drone 20, and other onboard software or firmware used to operate the drone 20. A controller 96 is shown having a first control stick 97 and a second control stick 98. The first stick 97 may control the throttle as well as one of yaw, pitch and elevation change. The second stick 98 may control the other remaining pair of yaw, pitch and elevation change. Other features may be provided on the controller 96 such as power level of a battery for the control station 90 as well as battery monitoring for the onboard battery of the drone 20. The controller station 90 may also include a transmitter to send flight control signals to the drone 20. Additionally, the control station 90 may include one or more receiver to receive signals from the drone 20 as well as video signals. A keyboard 99 may also be utilized from the control station 90 to allow for the programming and changes to the onboard avionics previously described.

The control station 90 may also include means to record the video or photos of camera 70. This media may be stored on a flash drive, USB card, hard drive or media storage device.

Figure 7:
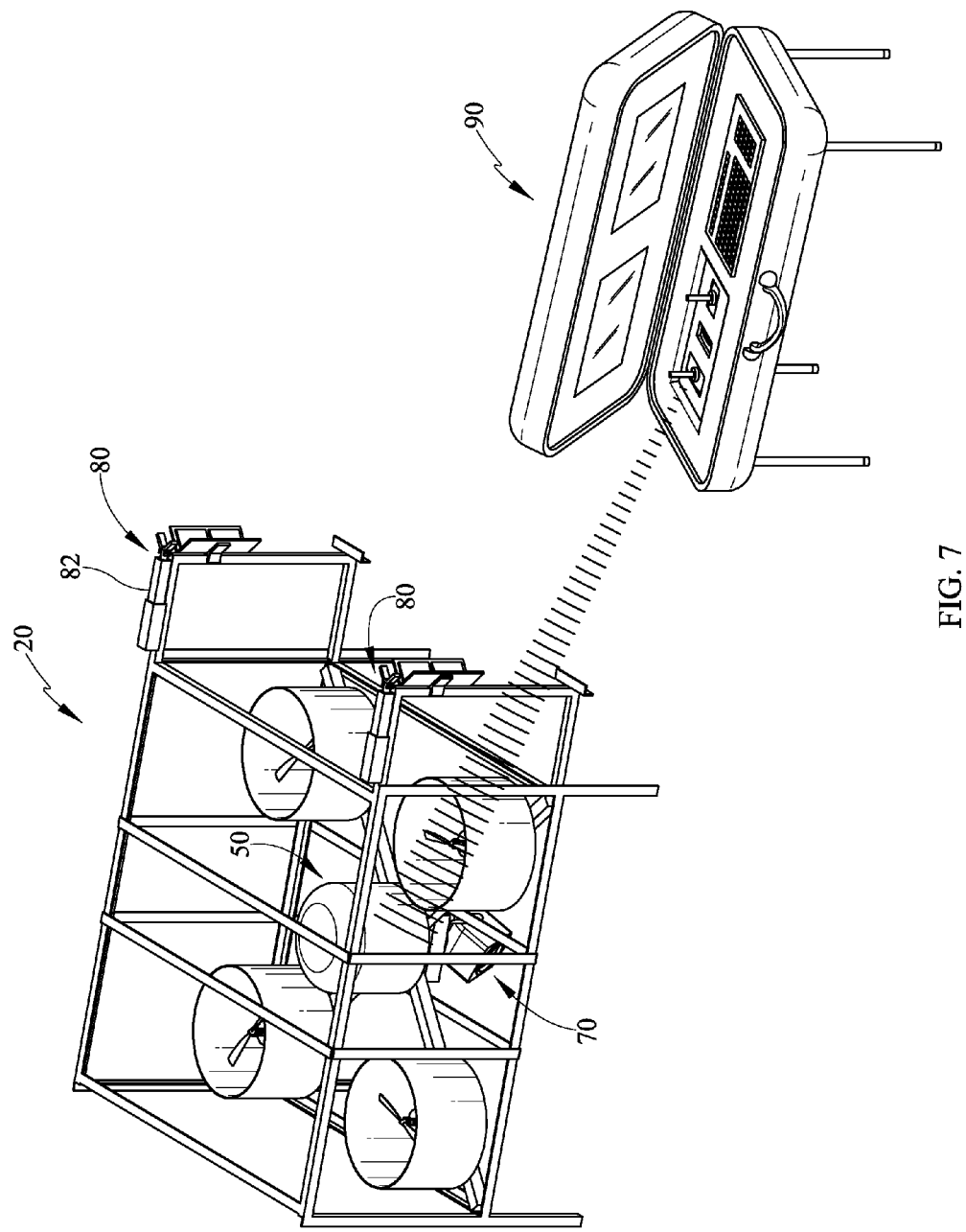
FIG. 7 is a perspective view of the drone and control station in communication.

Referring now to FIG. 7, a perspective view is shown of the drone 20 in combination with the control station 90. A wireless signal is shown emitting from the control station 90 and extending to the drone 20. The control station 90 also includes a wireless transmitter which may be, for example, Wi-Fi, blue-tooth, radio frequency (RF), or other such signal transmitter. The drone controller 50 receives the signal and includes a transmitter for wireless transmission of the video signal of the camera 70 back to the control station 90. Further, the controller station 90 may be utilized to control the actuators 82 of the detaching mechanism 80.

Figure 8:
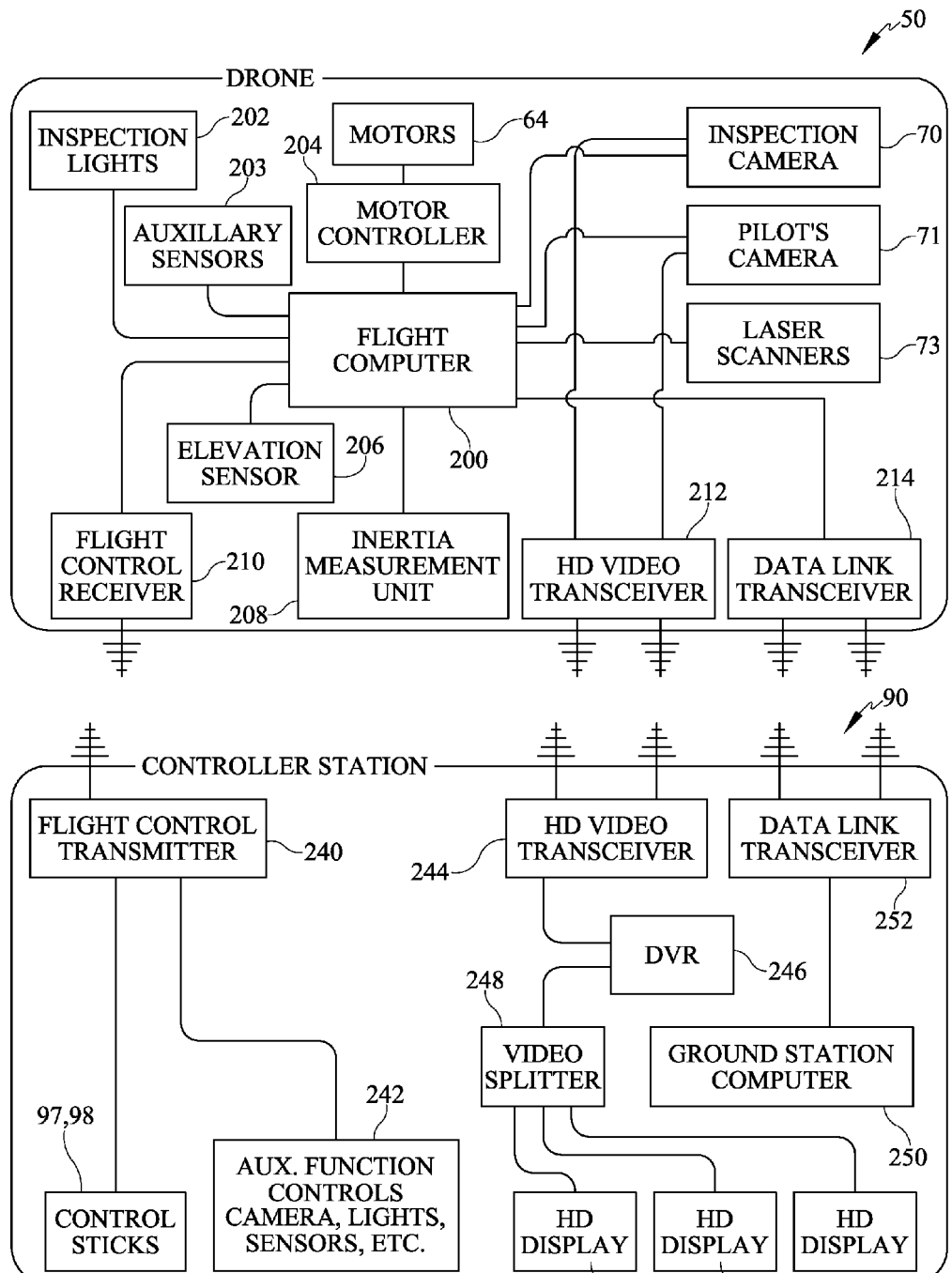
FIG. 8 is a schematic representation of various components of the drone controller.

Referring now to FIG. 8, a schematic view of the drone controller 50 and controller station 90 is depicted for aid and understanding the signals transmitted between the drone 20 and the controller station 90. Referring first to the drone controller 50, a flight computer 200 is located within the controller 50 designated by the housing in the various views of the drone 20. The flight computer 200 may be defined by microprocessor or other computer processing circuits. Various circuits and functions are associated with the flight computer 200. The drone 20 may include inspection lights 202 to aid in brightening a darkened enclosed space 12 and improve the inspection process. The flight computer 200 is also in communication with motor controllers 204 which drive the motors 64 of the propulsion assemblies. Additionally, while the drone 20 has been described have a camera 70, according to optional embodiments, multiple cameras may be utilized. For example, the inspection camera 70 may be in communication with the flight computer 200 as well as a pilot camera 71. Laser scanners 73 may be utilized to determine distances from the walls of the enclosed space 12. In such operation, the laser 73 emits a beam at a wall and based on time interval for receiving a reflected beam, the processor 200 can determine a distance the drone 20 is located from the interior wall of the enclosed space 12. The flight processor 200 may also be electrically connected to an elevation sensor 206. The elevation sensor 206 may be defined by a barometer, an ultrasonic sensor, a laser as previously described or a GPS system. Additionally connected to the flight computer 200 is an inertia measurement unit 208. The inertia measurement unit 208 utilizes various circuits to stabilize the drone 20 in flight. For example, this may include a barometer, a three-axis gyro, and three-axis accelerometer. Thus the user may provide flight input and the inertia measurement unit 208 may maintain stable attitude of the drone 20. The barometer may be in a separate unit or part of the inertia measurement unit 208 and stabilizes the drone 20 at altitude.

Additionally, the flight computer 200 is in electrical communication with multiple receivers, transmitters, or transceivers. A flight control receiver 210 receives flight control from a transmitter in the control station 90. More specifically, this receiver receives signals for control of the drone 20 in the various flight directions previously described, for example pitch, yaw, roll and elevation change or thrust increase or decrease. Additionally, at least one camera 70, 71 is connected to a high definition video transceiver 212. The transceiver 212 receives video signal from the inspection camera 70 and the pilot camera 71 and wirelessly transmits such signals back to the control station 90. Similarly, a data link transceiver 214 is connected to the flight computer 200. This transceiver 214 transmits flight data from the computer 200 to the control station 90 for viewing on the monitor 95 or alternatively for recording a subsequent review of flight data information related to the drone 20. For example, one part of the data may be related to altitude, battery life or relative distance between obstructions within the enclosed space 12.

Referring now to the control station 90 a plurality of transmission and receiving structures are utilized in the control station 90 to fly the drone 20 as well as receive and transmit data to the drone 20 and from the drone 20 such as flight data and video signals. The control station 90 includes a flight control transmitter 240 and may be established inside or outside the enclosed space 12 for line of sight flight or video enabled flight. The transmitter 240 includes attitude and altitude controls previously described as control sticks 97, 98, for example. The flight control transmitter 240 may include auxiliary function controls 242 such as for camera, lights and sensors. Also located in the control station 90 may be at least one high definition video transceiver 244 which sends and receives signals to the transceiver 212 on the drone 20 and may be primarily used to receive video signals from the inspection camera 70 and pilot camera 71 for further recording. As previously described, the recording process may occur on the drone 20 or may occur at the control station 90. A digital video recorder (DVR) 246 is depicted on the control station 90 but as previously described, may alternatively be located on the drone 20. The DVR 246 may include a video splitter 248 for the multiple displays 94, 95 on the control station 90. A third display is depicted in the schematic representation of FIG. 8. However, any number of displays may be utilized. The control station 90 may include a computer or other processing device 250 which is in communication with the DVR 246, video equipment 242, 248 as well as the transceiver 244 and a data link transceiver 252.

The data link transceiver 252 receives and transmits signals from and to the data link transceiver 214. These schematic representations are merely one embodiment of a variety of electrical hardware which may be utilized to fly the drone 20 and perform the inspections as desired.

Referring now to FIGS. 9-13, a sequence of movements of the drone 20 is depicted for landing the drone 20 on a surface which is vertical or substantially vertical, such as the interior wall of an enclosed space 12, for example a boiler. In the instant embodiment, the interior wall includes a plurality of steam tubes 14, as previously described and the drone 20 is depicted landing upon at least one of the steam tubes 14. In order to perform an inspection of an enclosed space 12, the drone 20 approaches the steam tube 14 at a preselected height where inspection is to occur. The drone 20 may include a light to shine upon the wall of the enclosed space 12 or the steam tubes 14 to improve illumination and visual inspection by way of video means. The drone 20 in the instant figure approaches the steam tubes 14 and moves toward the steam tubes 14 to hover and perform the inspection or may continue approaching.

With reference now to FIG. 10, the drone approaches closer to the steam tube 14 until the magnets 48 (FIG. 2) of the retaining mechanism 46 urge the drone 20 into engagement with the tubes 14. In this position, the propulsion assembly 60 may be powered down to conserve battery power and the camera 70 may scan the area visible adjacent to the drone 20 at the position where the drone 20 is engaging the steam tubes 14. Once the video scan or photograph(s) of the area is complete, the drone 20 is detached from the steam tubes 14.

Referring now to FIG. 11, the detachment mechanism 80 is shown forcibly disengaging the drone 20 from the tube 14 by actuating and pushing the drone from the tube 14. As depicted in the embodiment, the drone 20 is tilted back away from the tubes 14 as the magnetic force breaks the drone 20 away from the tubes 14. During the actuation process of the detachment mechanism 80, the propulsion assembly 60 may be powered up. This may occur through an interlock procedure such as a programmable logic controller in the drone controller 50 which causes the engines to power up during an outward actuation procedure of the detachment mechanism 80. Thus, when the magnets 48 (FIG. 2) break free of engagement with the steam tubes 14, the drone 20 will not fall but instead will hover due to the propulsion provided by the assemblies 60. However, one skilled in the art will understand that other retaining forces may be utilized, such as clamping force or alternate features.

Referring now to FIG. 12, the drone 20 is moved toward a second elevation. This movement is depicted by a vertical arrow, for example. Additionally, the drone 20 may move in any degree of freedom such horizontally toward or away from the steam tube 14 or into or out of the page as depicted in the embodiment. Any of these positions may represent a second position, relative to the first position in FIGS. 9 and 10. At the second position, the drone 20 moves toward the steam tubes 14 and the magnetic engagement of the retaining mechanism 46 causes grasping of the tubes 14 at this second location. Once the drone 20 is retained at the second position, the propulsion assemblies 60 are powered down to again conserve power and the video camera 70 may do a video scan of the area adjacent this second position for video transmission and inspection. The video transmission may occur and video may be recorded on board the drone 20, such as to a USB flash drive, for example, or other storage device, or the transmission may allow for recording at the controller station 90. Once the video inspection is done at the second location depicted in FIG. 13, the detachment mechanism 80 is actuated as depicted in FIG. 11 to detach the drone 20 and allow for movement to a third position, and so on.

Figure 14:
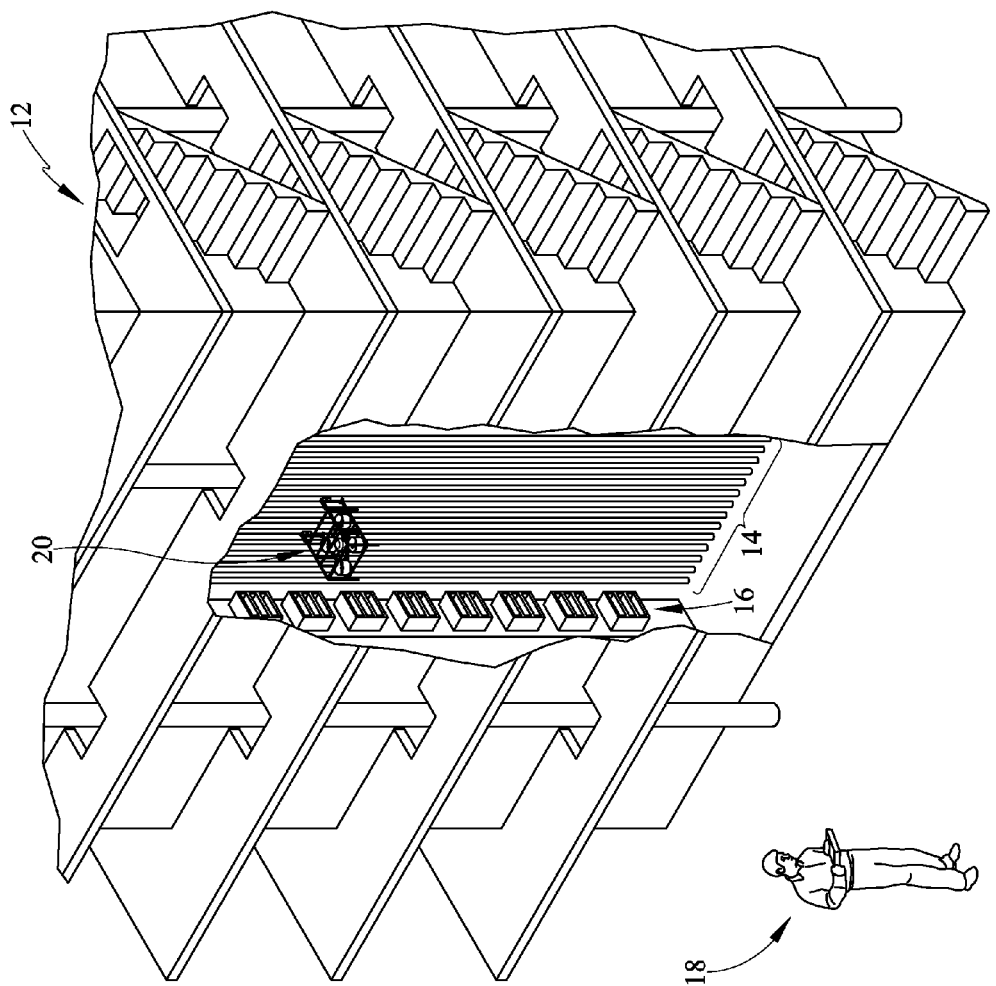
FIG. 14 is a perspective view of a drone within the enclosed space with its operator outside of the enclosed space.

Referring now to FIG. 14, a perspective view of an exemplary boiler 12 is depicted with a false section cut away to depict the interior portion of the boiler 12 including the steam tubes 14 and a burner array 16. The drone 20 is shown in a position wherein the drone has landed on the vertical piping array of steam tubes 14. The drone 20 may alternatively detach as previously described to investigate multiple positions along the steam tube array 14 or to inspect the multiple burners along the burner array 16. A user 18 is shown adjacent to the boiler 12 with a remote control system so that the drone 20 may be flown without line of sight view of the unmanned aerial vehicle (UAV). As an alternative, the user 18 may be within the boiler 12 and in visual contact with the drone 20 during use, but such is not absolutely necessary due to the video feedback between the drone 20 and the control station 90.

Figure 15:
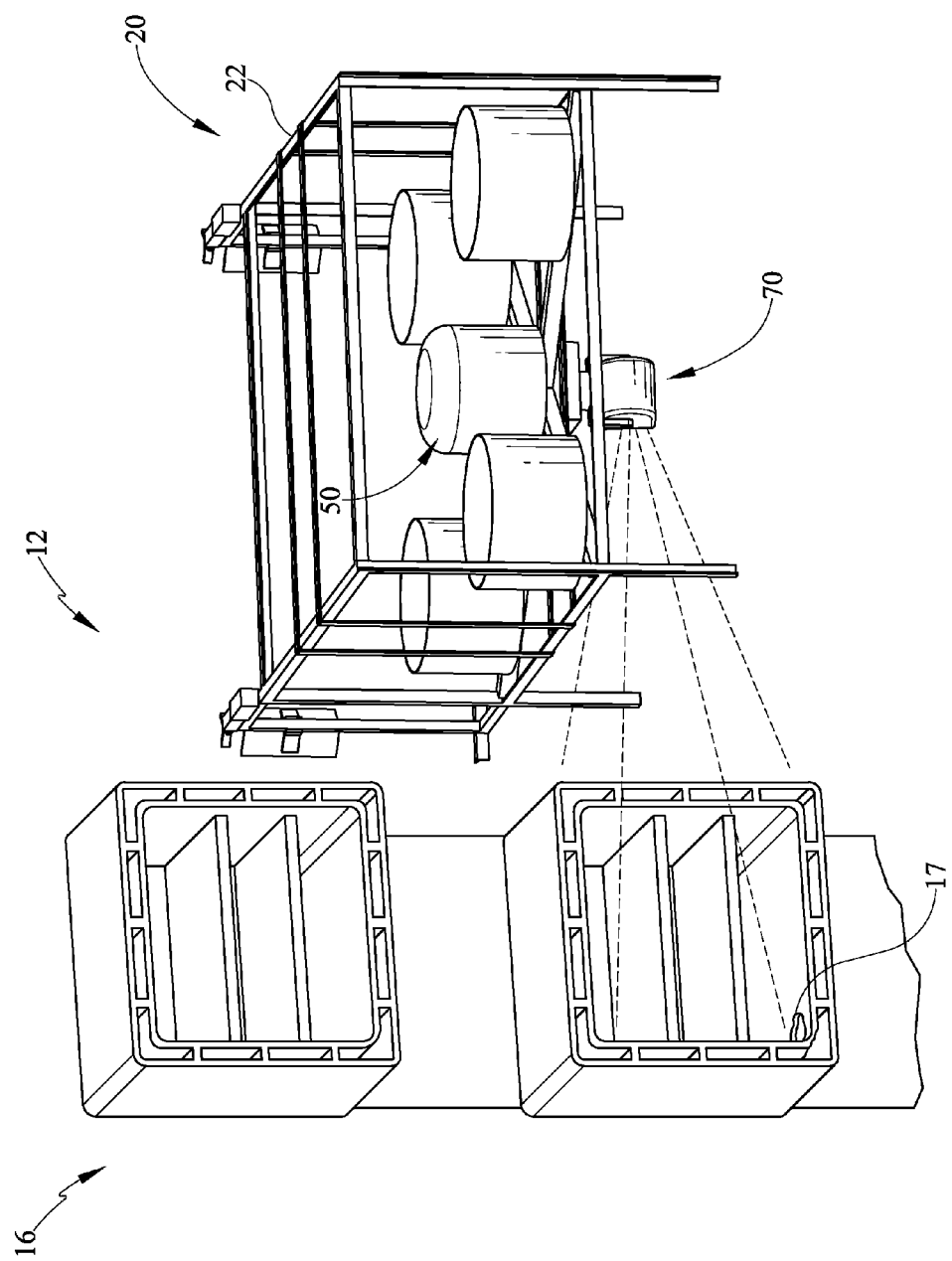
FIG. 15 is a perspective view of a drone flying adjacent to a burner array within a boiler for video inspection.

Referring now to FIG. 15, the drone 20 is shown in flight with the camera 70 during a visual inspection of a single burner on the array 16. An exemplary hole 17 depicts damage on one of the burners being inspected and such damage is of the exemplary type that the drone 20 would be utilized to inspect. The drone 20 may inspect these burners 16 by hovering at a specific position adjacent to the burners or alternatively may be retained on the boiler wall adjacent to the burner array 16 and rotate the camera 70 in such a manner as to inspect each of the burners 16.

The drone 20 may include ultrasonic or other sonar signal emitting structures to locate the drone 20 and maintain the drone 20 in a specific position relative to the walls of the enclosed space 12. The ultrasonic emitting structure may be located within the drone controller 50 or may be located at one or more positions of the drone 20 either interior of or exterior of the airframe 22. With the sonic emitting signal structure, the drone 20 may be controlled in enclosed spaces 12 within distances that are less than typical GPS units, generally about 3 meters.

Upon completing the process of moving through the various positions of the enclosed space 12, the various photos and video footage may be viewed by inspectors, in real-time or after the flight, and a report created. For example, each burner of the array 16 may be documented in the report by photo and comments of the maintenance condition. For example, as related to the damaged burner tip shown with the erosion 17 (FIG. 15) a report entry may be prepared as follows.

| LOCATION | REPAIR RECOMMENDATION OR CONDITION |
|---|---|
| C' Coal Nozzle | Plan For Future Replacement of Tip due to small erosion hole in the lower left corner CP Nozzle - monitor the mild erosion in both lower corners |

A plurality of these types of comment boxes, with or without photos, may be included in the report. Each of the boxes may define an inspection region of the enclosed space 12 so that a plurality of the comment boxes corresponds to a mapping or layout of the entire enclosed space 12. Thus a report is created for the entire volume of the enclosed space 12 by inspection of the plurality of small inspection areas.

Figure 16:
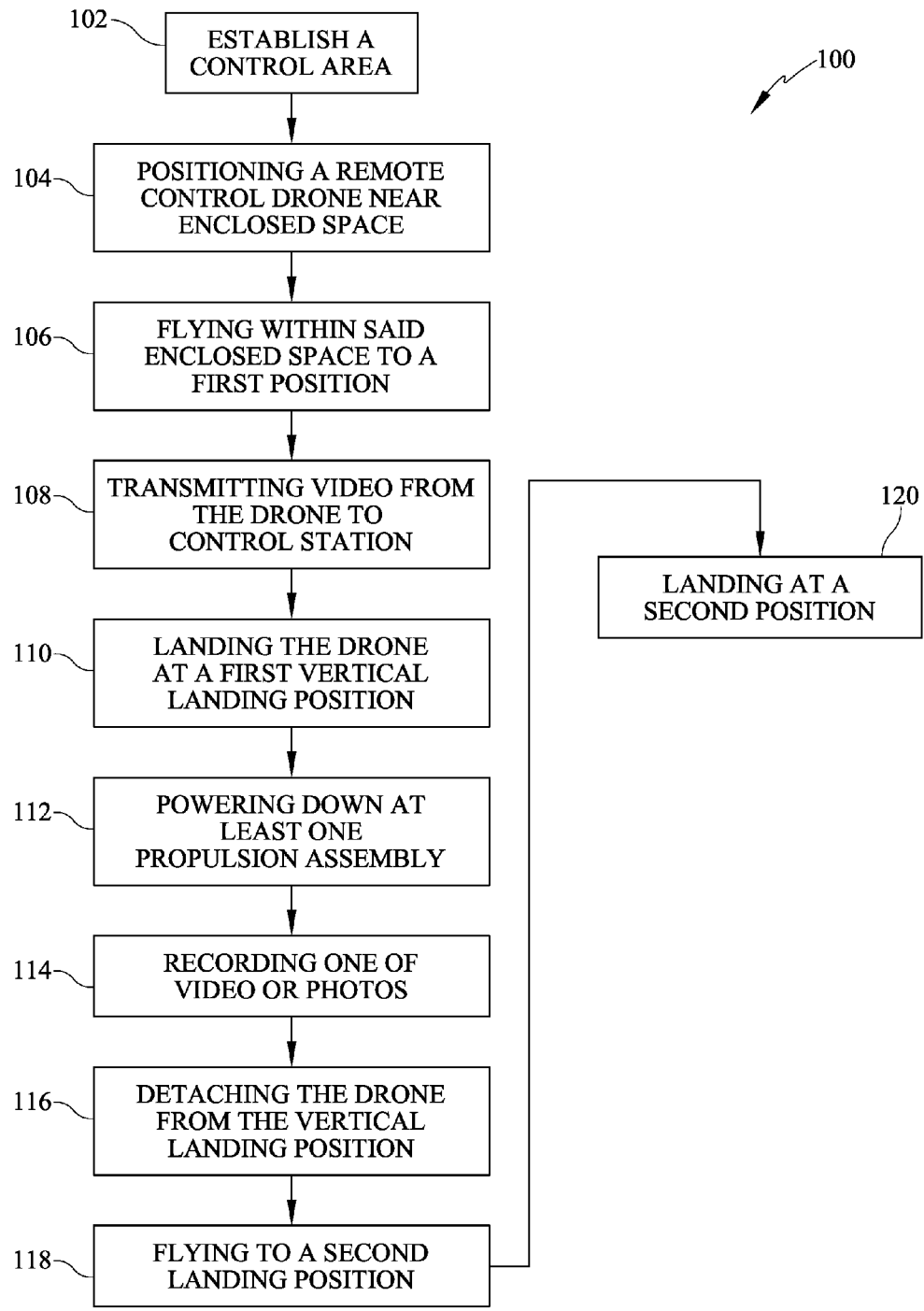
FIG. 16 is a flow chart depicting exemplary methods of performing an inspection of an enclosed space with a drone.

Referring now to FIG. 16, a flow chart depicts a method of inspecting an enclosed space 12 with a drone or inspection vehicle 20. The method 100 comprises establishing a control area 102 for the control station 90 and establishing a communication link between the drone 20 and the control station 90. Next, the remote control drone 20 is positioned 104 near an enclosed space 12. This positioning may be inside or outside of the enclosed space 12 and the control area which is established in 102 may alternatively be inside or outside the enclosed space depending on the type of flight—either of line-of-sight or non-line-of-sight flight. Next, the drone 20 is flown 106 within the enclosed space 12 to a first position. The first position may be any of various positions depending on the layout of the inspection process being performed. Next, video is transmitted 108 from the drone 20 to the control station 90. This transmission may occur prior to the flying of step 106 if the flight will be non-line-of-sight flight. Thus, the video linkage may need to be established prior to takeoff or immediately after takeoff. If necessary, the video is transmitted at step 108 from the drone 20 to the control station 90.

Next, the drone 20 lands 110 at a first landing position. This landing position may be on a vertical structure or surface or a substantially vertical structure or surface. Once the drone 20 lands at step 110, the at least one propulsion assembly may be powered down at step 112. This allows conservation of battery power for the device. Next, the camera 70 scans or inspects, at step 114, an area of the enclosed space 12. This may be recorded as video or may be recorded in the form of one or more photos of the area being inspected. When the scanning occurs, the video or photos are recorded at step 114. This recording process may occur onboard the drone 20 or at the control station 90 following transmission to the control station 90 from the drone 20. Upon completion of the inspection of an area at step 114, the drone 20 is detached at step 116 from the generally vertical landing position. Prior to this detaching, it may be desirable to power up the at least one propulsion assembly 60 so that the drone 20 can detach in a controlled manner without falling a vertical distance. Next, at step 118, the drone 20 is flown to a second landing position which again, may be a generally vertical surface or structure or alternatively may be a horizontal landing surface. The drone 20 lands 120 at the second position wherein the propulsion assembly 60 may be powered down and an inspection or scanning may be performed as previously described. This process continues until the entire enclosed space 12 or the areas of interest within the enclosed space 12 are fully inspected.

It should be noted that at any time during this method 100 the drone 20 may perform inspection by hovering at desired locations to perform the inspection or scanning with the camera 70. Such method is also within the scope of the instant embodiments.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A method of inspecting an enclosed space with an unmanned remote control aircraft with at least one camera, comprising:
    establishing a control area for flying said aircraft;
    flying said aircraft into a first inspection area within said enclosed space;
    capturing images of a condition of said first inspection area during said flight with said at least one camera; and,
    recording said images of said first inspection area at one of on-board said aircraft and at said control area.

2. The method of claim 1, wherein said control area is disposed outside of said enclosed space.

3. The method of claim 1, wherein said control area is disposed within said enclosed space.

4. The method of claim 3, wherein said flying is by line of sight.

5. The method of claim 1 further comprising hovering said aircraft at said first inspection area.

6. The method of claim 1 further comprising transmitting said images of a condition of said first inspection area.

7. The method of claim 6, wherein said images are in the form of video.

8. The method of claim 1, wherein said images are in the form of one of video or still photos.

9. The method of claim 1 further comprising transmitting said images to said control area.

10. A method of inspecting an enclosed space with an unmanned remote control aircraft with at least one camera, comprising:
    flying said aircraft to a first inspection area within said enclosed space;
    hovering said aircraft near said first inspection area within said enclosed space;
    capturing images of said first inspection area with said at least one camera; and,
    recording said images of said first inspection area at one of memory on-board said aircraft and at said control area.

11. The method of claim 10 further comprising establishing a control area to fly said aircraft which is one of inside or outside said enclosed space.

12. The method of claim 11 further comprising transmitting images to said control area when said control area is outside of said enclosed space.

13. The method of claim 10 further comprising flying said aircraft to a second inspection area.

14. The method of claim 10 further comprising creating a report for said first inspection area.

15. A method of inspecting an enclosed space with an unmanned remote control aircraft with at least one camera, comprising:
    flying said aircraft within an enclosed space for inspecting an inspection area within said enclosed space;
    capturing images of said inspection area with said at least one camera on-board said aircraft wherein said images are one of video or still images; and,
    recording said images of said inspection area at one of on-board said aircraft and at a control area.

16. The method of claim 15, said flying being by line of sight.

17. The method of claim 15, said flying being by video transmission.

18. The method of claim 17 further comprising transmitting said images from said aircraft to said control area.

19. The method of claim 15 further comprising hovering said aircraft in said first inspection area for said capturing images.

20. The method of claim 15 further comprising attaching said aircraft to a vertical surface adjacent to said first inspection area.

* * * * *